(12) United States Patent
Shon et al.

(10) Patent No.: US 8,285,986 B2
(45) Date of Patent: Oct. 9, 2012

(54) APPARATUS AND METHOD FOR DATA PACKET SECURITY IN A WIRELESS SENSOR NETWORK

(75) Inventors: Tae-Shik Shon, Suwon-si (KR); Hyo-Hyun Choi, Seoul (KR); Bon-Hyun Koo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 404 days.

(21) Appl. No.: 12/572,959

(22) Filed: Oct. 2, 2009

(65) Prior Publication Data

US 2010/0088510 A1 Apr. 8, 2010

(30) Foreign Application Priority Data

Oct. 2, 2008 (KR) .................. 10-2008-0097311

(51) Int. Cl.
*H04L 29/06* (2006.01)
*G06F 17/00* (2006.01)
*G06F 9/00* (2006.01)
*H04K 1/00* (2006.01)

(52) U.S. Cl. ............ 713/160; 713/150; 713/153; 726/1; 726/13; 380/255

(58) Field of Classification Search .................. 713/160, 713/150, 153; 726/1, 13; 380/255
See application file for complete search history.

(56) References Cited

U.S. PATENT DOCUMENTS

| 6,795,917 B1 * | 9/2004 | Ylonen .......................... 713/160 |
| 8,042,147 B2 * | 10/2011 | Byres et al. ........................ 726/1 |
| 2006/0098649 A1 * | 5/2006 | Shay ............................. 370/389 |
| 2010/0235880 A1 * | 9/2010 | Chen et al. ........................ 726/1 |

* cited by examiner

*Primary Examiner* — Mohammad W Reza
(74) *Attorney, Agent, or Firm* — The Farrell Law Firm, P.C.

(57) ABSTRACT

An apparatus and method for providing data packet security in a wireless sensor network including a plurality of sensor nodes. The apparatus includes a memory unit for storing a plurality of node characteristic information and a plurality of settable security status information, each of the node characteristic information corresponding to at least one of the settable security status information; and a control unit for examining the node characteristic information of the control unit, if a data packet generation request is made, detecting the security status information corresponding to the examined node characteristic information from the memory unit, and generating data packets including the detected security status information.

8 Claims, 5 Drawing Sheets

| | | | HASS #0 | HASS #1 | HASS #2 | HASS #3 | HASS #4 | HASS #5 | HASS #6 | HASS #7 |
|---|---|---|---|---|---|---|---|---|---|---|
| COMMON (32) | APPLICATION | PERIODIC | 0 | 0 | | | 0 | | | |
| | | URGENT-PERIO | 0 | 0 | | | 0 | | | |
| | | IMMEDIATE | 0 | 0 | | | 0 | | | |
| | | EVENTUAL | 0 | 0 | | | 0 | | | |
| | CONTROL | MOBILE CODE (OTA) | 0 | | | | 0 | 0 | | |
| | | LOCATION | 0 | | | | 0 | 0 | | |
| | | ROUTING | 0 | | | | 0 | 0 | | |
| | | SECURITY | 0 | | | | 0 | 0 | | |
| GENERAL (64) | APPLICATION | PERIODIC | 0 | | 0 | | | 0 | | |
| | | URGENT-PERIODIC | 0 | | 0 | | | 0 | | |
| | | IMMEDIATE | 0 | | 0 | | | 0 | | |
| | | EVENTUAL | 0 | | 0 | | | 0 | | |
| | CONTROL | MOBILE CODE (OTA) | 0 | | | | 0 | | 0 | |
| | | LOCATION | 0 | | | | 0 | | 0 | |
| | | ROUTING | 0 | | | | 0 | | 0 | |
| | | SECURITY | 0 | | | | 0 | | 0 | |
| PRIVATE (128) | APPLICATION | PERIODIC | 0 | | | 0 | | | 0 | |
| | | URGENT-PERIODIC | 0 | | | 0 | | | 0 | |
| | | IMMEDIATE | 0 | | | 0 | | | 0 | |
| | | EVENTUAL | 0 | | | 0 | | | 0 | |
| | CONTROL | MOBILE CODE (OTA) | 0 | | | | 0 | | | 0 |
| | | LOCATION | 0 | | | | 0 | | | 0 |
| | | ROUTING | 0 | | | | 0 | | | 0 |
| | | SECURITY | 0 | | | | 0 | | | 0 |

FIG.2

| ALGORITHM TYPE | HASS #0 | HASS #1 | HASS #2 | HASS #3 | HASS #4 | HASS #5 | HASS #6 | HASS #7 |
|---|---|---|---|---|---|---|---|---|
| | – | ENC #N | MIC #N | MIC #N | MIC #N | ENC #N + MIC #N | ENC #N + MIC #N | ENC #N + MIC #N |
| AUTHENTICATION | – | | 0 | 0 | 0 | 0 | 0 | 0 |
| INTEGRITY | – | | 0 | 0 | 0 | 0 | 0 | 0 |
| CONFIDENTIALITY | – | 0 | | | | 0 | 0 | 0 |
| SIZE (BITS) | – | 0 | 32 | 64 | 128 | 32 | 64 | 128 |

FIG. 3

APPARATUS AND METHOD FOR DATA PACKET SECURITY IN A WIRELESS SENSOR NETWORK

This application claims priority under 35 U.S.C. §119(a) to an application filed in the Korean Industrial Property Office on Oct. 2, 2008 and assigned Serial No. 10-2008-0097311, the content of which is incorporated herein by reference.

BACKGROUND OF THE INVENTION

1. Field of the Invention

The present invention relates generally to a wireless sensor network, and more particularly to an apparatus and method for providing security of data packets that are transmitted and received among sensor nodes of the wireless sensor network.

2. Description of the Related Art

In general, wireless sensor network technology enables an autonomous network including a plurality of sensor nodes that perform a computing function and a wireless communication function. The plurality of sensor nodes transmit and receive sensed information acquired through the wireless sensor network. It is also possible to perform remote control or monitoring through the network.

In such a wireless sensor network, a sensor node transmits information sensed by a sensor to a sink node, and the sink node transmits the received information to a base station that serves as a gateway. Also, the base station transfers the sensed information to a user that is to receive the information through a network.

Because a wireless sensor network includes sensor nodes that are powered by small batteries that are basically non-exchangeable, the respective sensor nodes can only transmit/receive data depending on the given life span of the batteries. Accordingly, it is preferable to reduce the amount of energy that is consumed when data is transmitted and received among the sensor nodes. From this viewpoint, protocols for sensor network environments, which are independent for respective layers, have been proposed, and as a primary study, energy-efficient protocols in Medium Access Control (MAC) layers and network layers of the sensor network have been proposed. Also, energy-efficient protocols in an ad-hoc sensor network, which operates according to the ad-hoc dispersed structure of the wireless sensor network, have been proposed.

In the sensor network, security suites for data security are preset when data packets for transmitting and receiving data among the sensor nodes are generated, and data, to which the preset security suites have been adapted, are transmitted and received. The security suites, after being initially set as described above, are continuously used when the sensor nodes transmit and receive the data.

According to the conventional wireless sensor network as described above, data is transmitted and received among the sensor nodes using the preset security suites, regardless of network characteristics, application characteristics, and control characteristics. Consequently, energy consumption involving the preset security suites in unnecessarily high.

For example, if the wireless sensor network characteristic is a public network characteristic that does not require the security function, this network is not required to set the data security suites among the sensor nodes. However, according to the conventional wireless sensor network, the data is transmitted and received through the setting of the data security suites, even in the public network characteristic, and thus unnecessary energy consumption occurs.

Also, in the conventional wireless sensor network, a fixed security level is always provided during data transmission and reception, and thus, an unnecessarily excessive security function is provided.

SUMMARY OF THE INVENTION

Accordingly, the present invention has been designed to solve the above-mentioned problems, and provide at least the advantages as will be described below. Accordingly, an aspect of the present invention provides an apparatus and method for data packet security, which minimizes energy consumption in a wireless sensor network, as compared to a conventional wireless sensor network.

In accordance with an aspect of the present invention, there is provided an apparatus for data packet security in a wireless sensor network including a plurality of sensor nodes. The apparatus includes a memory unit for storing a plurality of node characteristic information and a plurality of settable security status information, each of the node characteristic information corresponding to at least one of the settable security status information; and a control unit for examining the node characteristic information of the control unit, if a data packet generation request is made, detecting the security status information corresponding to the examined node characteristic information from the memory unit, and generating data packets including the detected security status information.

In accordance with another aspect of the present invention, there is provided a method for the security of data packets in a wireless sensor network including a plurality of sensor nodes. The method includes storing, in a memory unit, a plurality of node characteristic information and a plurality of settable security status information, each of the node characteristic information corresponding to at least one of the settable security status information; examining, by a control unit, the node characteristic information of a corresponding node, if a data packet generation request is made; detecting the security status information corresponding to the examined node characteristic information; and generating data packets including the detected security status information.

BRIEF DESCRIPTION OF THE DRAWINGS

The above and other aspects, features, and advantages of the present invention will be more apparent from the following detailed description taken in conjunction with the accompanying drawings, in which:

FIG. 2 is a table representing hybrid adaptive security suites that can be set in accordance with characteristic information of sensor nodes according to an embodiment of the present invention;

FIG. 3 is a table representing hybrid adaptive security suites according to an embodiment of the present invention;

DETAILED DESCRIPTION OF THE EMBODIMENTS OF THE INVENTION

Embodiments of the present invention will be described with reference to the accompanying drawings. The following description of the exemplary embodiments employs a sensor node as an example of the wireless sensor network security apparatus. In the following description, detailed descriptions of known functions and configurations will be omitted, when they may obscure the subject matter of the present invention.

Figure 1:
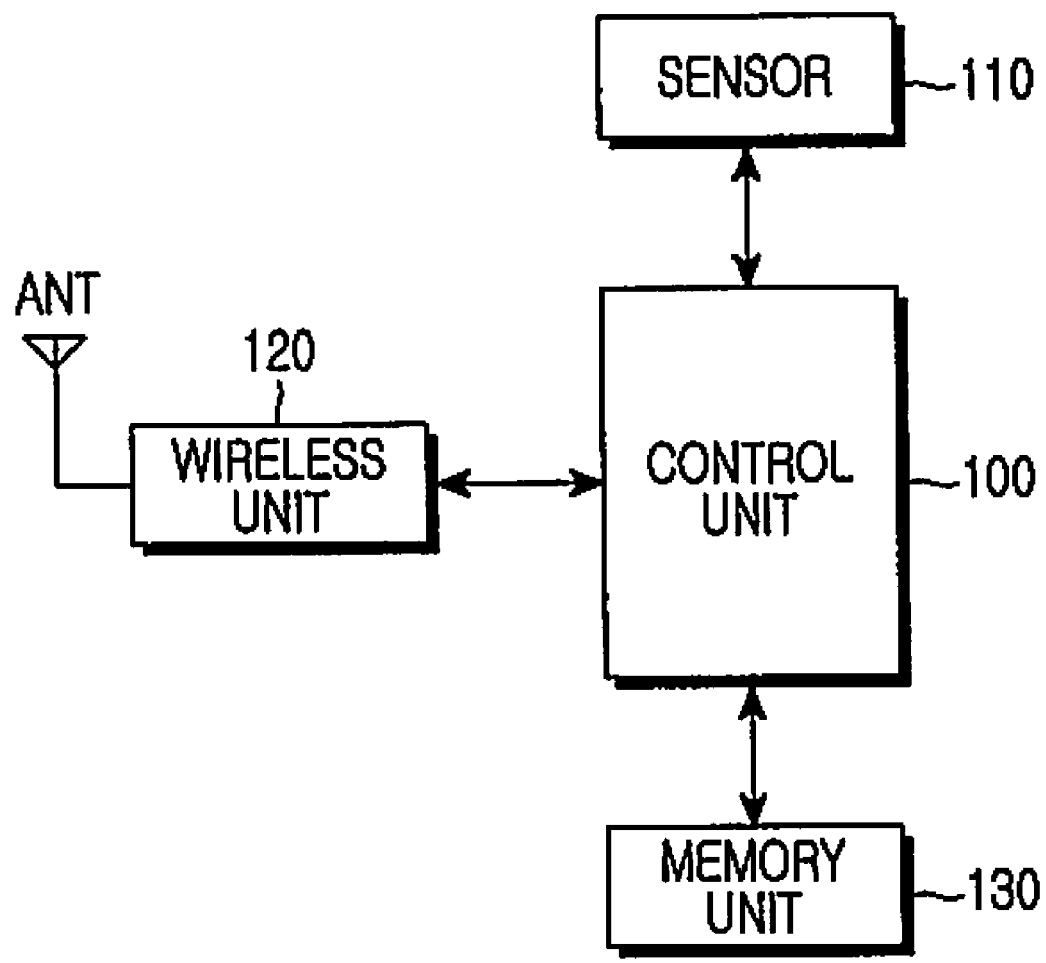
FIG. 1 is a block diagram illustrating a data security apparatus in a wireless sensor network according to an embodiment of the present invention.

FIG. 1 illustrates a wireless sensor network security apparatus according to an embodiment of the present invention Referring to FIG. 1, a sensor node includes a control unit 100, a sensor 110, a wireless unit 120, and a storage unit 130. The control unit 100 controls the operation of the wireless sensor network security apparatus. In particular, the control unit 100 stores information sensed through the sensor 110 in the memory unit 130. and identifies when a request to generate data packets, each including the stored sensed information, has been made. When the request to generate the data packets has been made, the control unit 100 examines the characteristic information of the current sensor node, before generating the data packets. Here, the characteristic information of the sensor node includes characteristic information of a network to which the current sensor node belongs, and data characteristic information including application characteristic information and control characteristic information of the current sensor node. The network characteristic information includes at least one of a common network, a general network, and a private network, and the application characteristic information includes at least one of periodic execution, urgent-periodic execution, immediate execution after a request, and application executed when an event occurs. Also, the control characteristic information includes at least one of an Over The Air (OTA) mobile code, a location, a routing, and a control according to the security.

Thereafter, the control unit 100 detects security status information that can be set in accordance with the examined characteristic information from a security information table representing Hybrid Adaptive Security Suites (HASSs), which are the security status information that can be set in accordance with the characteristic information stored in the memory unit 130. The security information table, as illustrated in FIG. 2, includes a list of characteristic information and the HASSs that can be adapted in accordance with the corresponding characteristic information list. The security information table is pre-stored in the memory section 130.

FIG. 2 is a table representing HASSs that can be set in accordance with characteristic information of sensor nodes according to an embodiment of the present invention.

For example, it is assumed that the network characteristic of the current sensor node is a common network, and the application characteristic is executable when an event occurs. In this case, the control unit 100 confirms the HASSs corresponding to the confirmed characteristic information in a security setting table stored in the memory unit 130 by using the confirmed characteristic information. At this time, the confirmed HASSs may be HASS#0, HASS#1, and HASS#4.

The HASSs as described above are constructed in a table as illustrated in FIG. 3, and are pre-stored in the memory unit 130.

FIG. 3 is a table representing HASSs according to an embodiment of the present invention. In FIG. 3, 8 HASSs are provided in all.

As illustrated in FIG. 2, the HASS includes information about a type of security algorithm of a data packet, authenticated setting of a data packet, redundancy check in a data packet, guarantee of secrecy of a data packet, and the size of a MAC protocol adapted to a data packet. For example, if the security suite of the data packet is set to HASS#1, the control unit 100 uses a security algorithm ENC #N, which corresponds to HASS#1, to set the secrecy guarantee of the data packet, and sets the size of the MAC protocol to "0."

The security algorithm of the HASS as described above, is shown in more detail below in Table [1]. In this case, ENC #N and MIC #N may have a value of 1~n, and ENC #1, #2, and MIC #1, #2 have code algorithms as will be described below. ENC #3 and MIC #3 are used as user definition suites.

TABLE 1

| Algorithm Type | Definition | Remarks |
| --- | --- | --- |
| ENC #1 | AES-128 CCM*(ENC) | CCM is a fixed construction of IEEE 802.15.4-2006 specifications. |
| MIC #1 | AES-128 CCM*(MAC) | |
| ENC #2 | AES-128 CTR | |
| MIC #2 | AES-128 CBC-MAC | |
| ENC #3~#n | User Definition | Algorithm, such as SkipJack, RC5, and MD5, can use user definition, and a set field of a sink message is used for user definition. |
| MIC #3~#n | User Definition | |

The control unit 100 generates a data packet to which either of the confirmed HASSs has been adapted, and transmits the generated data packet to other sensor nodes through the wireless unit 120. At this time, the control unit 100 may select the HASS having a high security level among HASSs optionally selected in the sensor node, or the HASS having the smallest size.

Because the sensor node sets the security suite that matches its characteristic information through the above-described process, the battery power consumption can be reduced, and data security can be improved.

Also, the sensor 110 senses reactions to surrounding environments, such as temperature, pressure, and transmits this sensed information to the control unit 100. In this case, for example, the sensor may be a pressure sensor, a temperature sensor, a vacuum sensor, or an ultrasonic sensor.

The wireless unit 120 transmits data packets including the information sensed by the sensor 110. The wireless unit 120 also receives a message from a sink node.

The memory unit 130 stores the information sensed by the sensor 110. Also. the memory unit 130 stores a list of characteristic information, e.g., a table as illustrated in FIG. 2, in which HASSs correspond to the characteristic information, and a table as illustrated in FIG. 3, which includes information about the HASSs.

In accordance with an embodiment of the present invention, the sensor node can detect the security status information corresponding to the characteristic information of the sensor node using the above-described tables.

Figure 4:
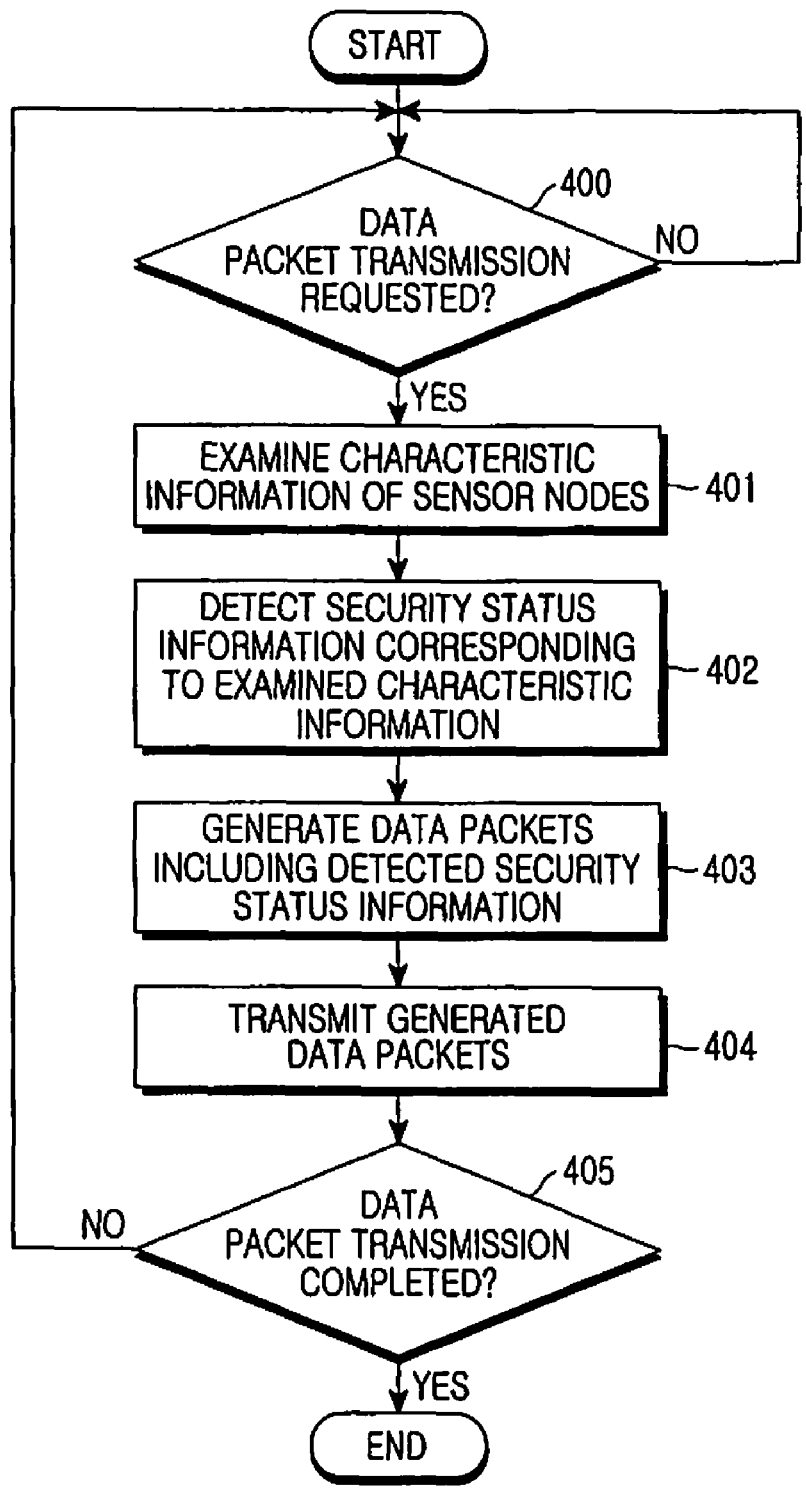
FIG. 4 is a flowchart illustrating a process of transmitting data packets including security status information in accordance with characteristic information of sensor nodes in a wireless sensor network according to an embodiment of the present invention.

FIG. 4 is a flowchart illustrating a process of transmitting data packets including security status information in accordance with characteristic information of sensor nodes in a wireless sensor network according to an embodiment of the present invention.

Referring to FIG. 4, the control unit 100 continually checks whether a request for data packet transmission has been made in step 400. When the request has been made, the control unit examines the characteristic information of the sensor node in step 401. That is, the control unit examines network characteristic information to which the sensor node belongs, application characteristic information. and control characteristic information of the sensor node.

In step 402, the control unit 100 detects the security status information corresponding to the characteristic information examined in step 401, using the table illustrated in FIG. 2. For example, if the examined network characteristic information refers to a common network and the control characteristic information refers to a control for security, the control unit 100 detects the security status information corresponding to the characteristic information, e.g., HASS #4 and HASS #5, using the table as illustrated in FIG. 3.

In step 403, the control unit 100 selects any one of the detected security status information, and generates a data packet including the selected security status information. In this case, the control unit 100 can select the security status information having a high security level among the security status information optionally selected in the sensor node, or the security status information having the smallest size using the table as illustrated in FIG. 3. Also, the control unit 100 can select the security status information that is intended to be set in accordance with a user's request.

In step 404, the control unit 100 transmits the generated data packet to other sensor nodes.

In step 405, the control unit 100 checks whether a request for ending the data packet transmission has been made. If the request has been made, the control unit 100 terminates the data packet transmission. However, if the request has not been made, the control unit 100 again checks whether a request for data packet transmission has been made in step 400.

Through the above-described process, a sensor node generates and transmits a data packet including security status information according to characteristic information of the current sensor node. Consequently, the data security of the sensor node according to the diverse characteristic information is improved, while the battery power consumption is reduced.

Further, in accordance with an embodiment of the present invention, each sensor node can change the security status information through the sink node, as well as transmit and receive data packets including the security status information. This feature will be described in more detail below with reference to FIGS. 5 and 6.

Figure 5:
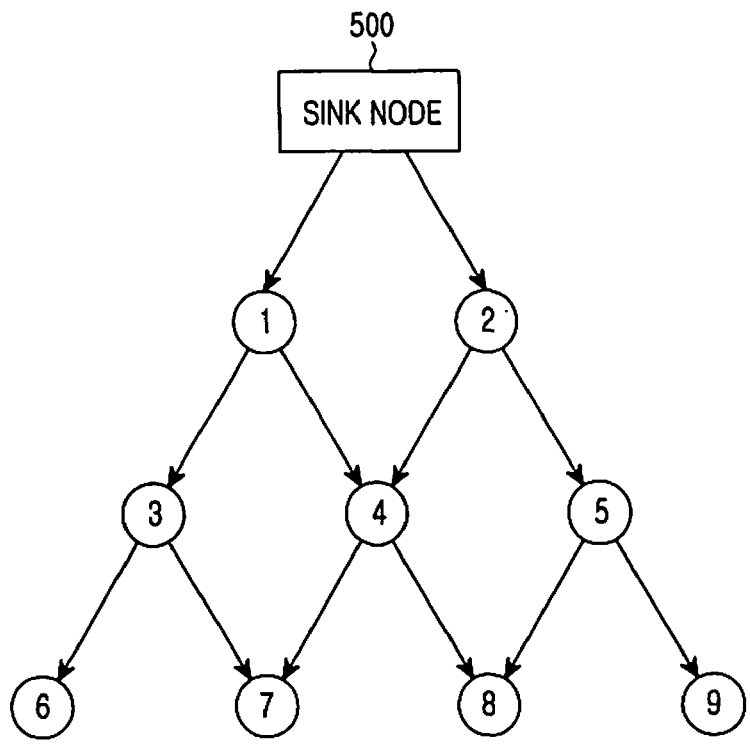
FIG. 5 is a diagram illustrating a sink node changing security status information of a network according to an embodiment of the present invention.

FIG. 5 is a diagram illustrating a sink node changing security status information of all sensor nodes included in a network according to an embodiment of the present invention.

In FIG. 5, the network includes a sink node 500 and first to ninth sensor nodes, and it is assumed that the characteristic information of the corresponding network refers to the common network.

If a user request to change the network characteristics of the first to ninth sensor nodes included in the current network is received, the sink node 500 generates and broadcasts an update network characteristic message for changing the network characteristic to the first to ninth sensor nodes. If the update network characteristic message, which includes information to change the network characteristic to the private network, is received, the sensor nodes change the network characteristic information from the common network to the private network. Thereafter, the sensor nodes generate and transmit data packets including the security status information corresponding to the private network. Accordingly, the data packet security level of all of the sensor nodes of network can be heightened or lowered in accordance with the user request.

Figure 6:
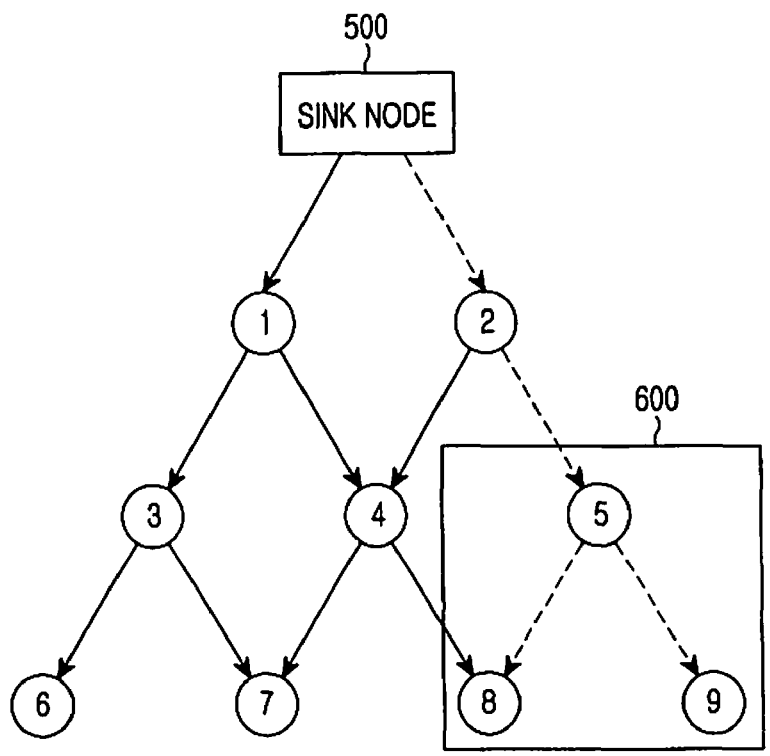
FIG. 6 is a diagram illustrating a sink node changing security status information of a selection of sensor nodes included in a network according to an embodiment of the present invention.

FIG. 6 is a diagram illustrating a sink node changing security status information of a selected number of sensor nodes included in a network according to an embodiment of the present invention.

For example, if a user request to change the security status information of the fifth, eighth, and ninth nodes, indicated as "600" in FIG. 6, is received, the sink node 500 generates a user request security message to change the security status information of the fifth, eighth, and ninth nodes, and performs unicast or multicast transmission of the generated message. In this case, the user request security message may include the characteristic information to change the characteristic information of the part of the sensor nodes, or the user request security information to set the user request security of the part of the sensor nodes.

If the received user request security message includes information to change the security status information of the fifth, eighth, and ninth sensor nodes, the fifth, eighth, and ninth sensor nodes change the characteristic information to the characteristic information included in the received user request security message. Also, if the received user request security message includes the user request security information to set the user request security of the fifth, eighth, and ninth sensor nodes, the fifth, eighth, and ninth sensor nodes set the user request security in accordance with the user request security information included in the received user request security message. In this case, the user request security information may include at least one of a security suite set by the user and an encryption algorithm option. Accordingly, the security settings of the selected sensor nodes included in the network can be changed by the sink node 500.

As described above, according to the embodiments of the present invention, data packets including the security status information that can be set according to the diverse characteristic information of the sensor node, such as network characteristic among sensor nodes included in the wireless sensor network, an application characteristic, and a control characteristic, are transmitted and received. Consequently, an efficient data security function is applied in accordance with the diverse network characteristic, the application characteristic, and the control characteristic, such that the data security can be improved, and the battery power consumption by the sensor node can be reduced.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An apparatus for providing data packet security in a wireless sensor network including a plurality of sensor nodes, the apparatus comprising:
   a memory unit for storing a security information table including a plurality of node characteristic information and at least one of settable security status information corresponding to the plurality of node characteristic information; and
   a control unit for examining the node characteristic information of the control unit, if a data packet generation request is made, detecting the security status information corresponding to the examined node characteristic information using the security information table stored in the memory unit, and generating data packets including the detected security status information, wherein the node characteristic information comprises at least one of network characteristic information;

application characteristic information; and control characteristic information.

2. The apparatus of claim 1, wherein the security status information comprises a Hybrid Adaptive Security Suite (HASS).

3. The apparatus as claimed in claim 2, wherein the HASS comprises at least one of:

a security status algorithm;

authentication information;

redundancy information;

secrecy guarantee information; and size information.

4. The apparatus of claim 1, further comprising:

a wireless unit for transmitting and receiving messages, wherein if an update security status message including node characteristic change information is received through the wireless unit, the control unit changes the node characteristic information using the received update security status message, detects the security status information corresponding to the changed node characteristic information, generates the data packets including the detected security status information, and transmits the data packets to other sensor nodes.

5. A method for providing data packet security in a wireless sensor network including a plurality of sensor nodes, the method comprising:

storing, in a memory unit, a security information table including a plurality of node characteristic information and at least one of settable security status information corresponding to the plurality of the node characteristic information;

examining, by a control unit, the node characteristic information of a corresponding node, if a data packet generation request is made;

detecting the security status information corresponding to the examined node characteristic information using the security information table stored in the memory unit; and generating data packets including the detected security status information, wherein the node characteristic information includes at least one of network characteristic information, application characteristic information, and control characteristic information.

6. The method of claim 5, wherein the security status information includes a Hybrid Adaptive Security Suite (HASS).

7. The method of claim 6, wherein the HASS includes at least one of a security status algorithm, authentication information, redundancy information, secrecy guarantee information, and size information.

8. The method of claim 5, further comprising:

receiving an update security status message including node characteristic change information, before generating the data packet; and changing the node characteristic information using the received update security status message.

* * * * *